United States Patent [19]

Douglas

[11] 4,225,220

[45] Sep. 30, 1980

[54] CAMERA HAVING MANUALLY OPERABLE DARK SLIDE EJECTION APPARATUS

[75] Inventor: Lawrence M. Douglas, South Easton, Mass.

[73] Assignee: Polaroid Corporation, Cambridge, Mass.

[21] Appl. No.: 72,488

[22] Filed: Sep. 4, 1979

Related U.S. Application Data

[62] Division of Ser. No. 893,487, Apr. 4, 1978.

[51] Int. Cl.³ .................. G03B 17/50; G03B 1/00; G03B 17/04
[52] U.S. Cl. .................................. 354/86; 354/124; 354/194
[58] Field of Search .................. 354/83, 86, 194, 124

[56] References Cited

U.S. PATENT DOCUMENTS

| | | | |
|---|---|---|---|
| 3,750,551 | 8/1973 | Land et al. | 354/83 |
| 3,757,657 | 9/1973 | Eloranta et al. | 354/86 |
| 3,868,709 | 2/1975 | Douglas | 354/86 X |
| 3,889,280 | 6/1975 | Biber | 354/86 |
| 3,936,850 | 2/1976 | Goto | 354/86 X |
| 3,965,480 | 6/1976 | Eloranta | 354/83 |
| 3,987,466 | 10/1976 | Murray | 354/83 |
| 4,104,660 | 8/1978 | Norris | 354/86 X |

Primary Examiner—Donald A. Griffin
Attorney, Agent, or Firm—Alfred E. Corrigan

[57] ABSTRACT

A hand-held camera adapted for use with a film cassette containing at least one film unit and a separate overlying opaque cover sheet which is adapted to protect the film unit from exposure during the loading of the cassette into the camera. The camera includes a film cassette positioning member drivingly engageable with a film advancing apparatus and with a pair of juxtaposed rollers, and a manually operable member connected with the film cassette positioning member. Upon actuation of the manually operable member, the film cassette positioning member is moved to thereby reposition the film cassette within the camera while simultaneously driving the film advancing apparatus in a manner which moves the opaque cover sheet partially out of the film cassette and into the bite of the rollers, which in turn continue its movement away from the film cassette thereby preparing the film unit for exposure.

7 Claims, 13 Drawing Figures

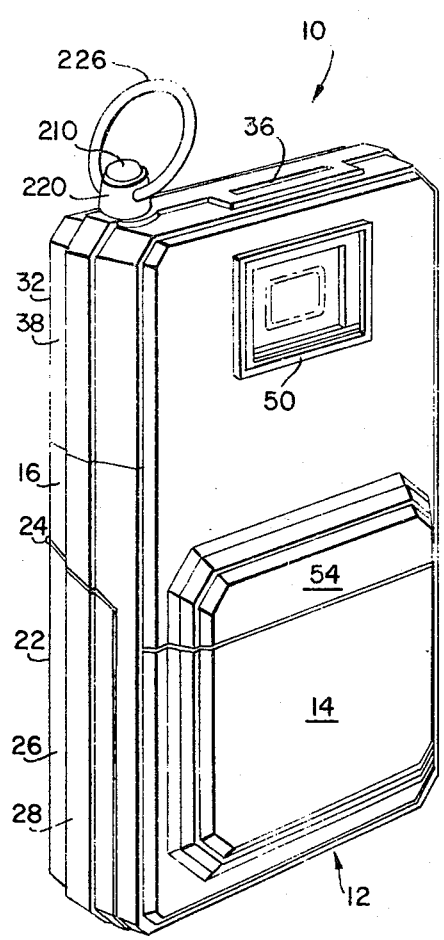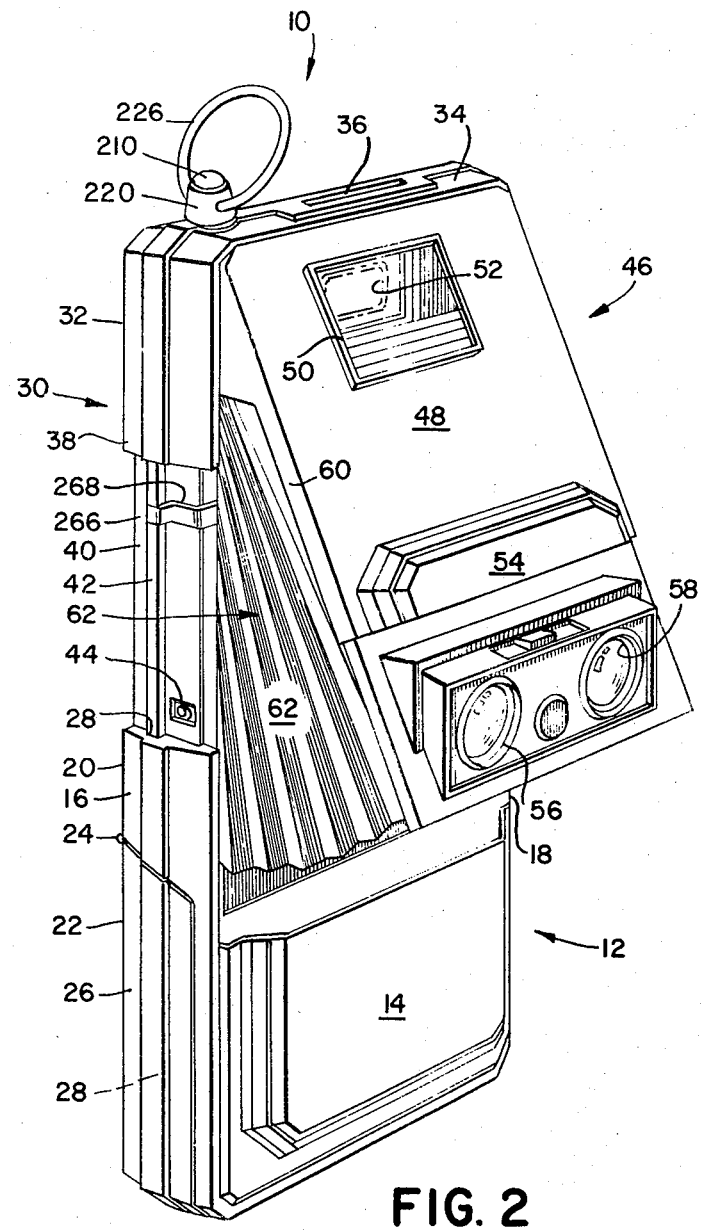
FIG. 1
FIG. 2

CAMERA HAVING MANUALLY OPERABLE DARK SLIDE EJECTION APPARATUS

RELATED APPLICATIONS

This application is a division of my copending application Ser. No. 893,487, filed Apr. 4, 1978.

This application is also related to my application Ser. No. 893,488 entitled "Dual Focal Plane Photocells", filed Apr. 4, 1978.

BACKGROUND OF THE INVENTION

1. Field of the Invention

This invention relates to a hand-held camera having manually operable means for removing a dark slide or opaque cover sheet from a film cassette while the latter is being located in position for exposure of a film unit.

2. Description of the Prior Art

Photographic apparatus for exposing successive portions of the same light sensitive surface of a film unit or of a predetermined area of a strip or reel of film are generally well known. One example of this type of photographic apparatus is a camera having a movable frame for supporting a predetermined area of a roll of film beneath a fixed lens system which focuses an image of a subject onto a discrete portion or exposure frame of the predetermined area of the film. After the discrete portion has been exposed, the movable frame is automatically indexed one position laterally so that a new unexposed discrete portion of the film is brought into position for exposure by the lens system. This portion of the film is then exposed and the movable frame is again automatically indexed or shifted one position laterally so that another unexposed portion is brought into position for exposure. This sequence of steps is repeated across the width of the film until a complete row of frames has been exposed. After the last frame in the row has been exposed, the movable frame is automatically returned to its original position such that the first exposed frame is once again located in position for exposure. The movable frame is then automatically indexed one position longitudinally so that the first frame in the next row is located in position for exposure. For an example of this type of camera reference may be had to U.S. Pat. No. 3,680,461.

While the type of camera shown in the above-mentioned patent may be suitable for its intended purpose, i. e., recording large amounts of information in a very limited space, it does have its disadvantages. For example, the rather large movable frame must be indexed or shifted after each exposure therefore requiring a rather complicated and costly apparatus for indexing the movable frame. Further adding to the complexity and cost of the indexing apparatus is the fact that it must be capable of shifting the movable frame longitudinally as well as laterally. Another disadvantage to the above described camera is its lack of portability, i. e., it does not readily lend itself to being hand carried so that the user thereof could take a multiple of street scenes on a single sheet of film.

Another example of photographic apparatus of the type described is shown in U.S. Pat. No. 2,497,559. This patent describes a multiple exposure camera of the type which also includes a movable frame for supporting a film-holder in position for the exposure of a first predetermined portion of the film supported by the film-holder. After the first predetermined portion has been exposed, a spring wound motor automatically indexes the movable frame one step in a longitudinal direction to bring a second predetermined portion of the film into position for exposure. Subsequent to the exposure of the second predetermined portion, the motor indexes the movable frame one step in a lateral direction to bring a third predetermined portion of the film into exposure. The third predetermined portion of the film is exposed and the motor is again actuated to index the movable frame one step in a longitudinal direction, generally opposite to the first mentioned longitudinal direction, to bring a fourth and final predetermined portion of the film into position for exposure. After the fourth predetermined portion of the film has been exposed, the movable frame is indexed one step in a lateral direction, generally opposite to the first mentioned lateral direction, to return the movable frame to its original position.

Although the above-described multiple exposure camera may be particularly suited for use in a situation where the size of the camera is generally of no consequence, e. g., in portrait photography, it does not readily lend itself to application in a small, inexpensive, compact camera of the type which is adapted to be hand carried. The apparatus for indexing the movable frame after every exposure is relatively complex and together with the movable frame occupies a great amount of space in that the chamber in which the movable frame is mounted must be fifty percent longer and fifty percent wider than the length and width, respectively, of the movable frame.

Another problem associated with cameras of the type shown and described in the aforementioned patents is that the users of the cameras do not know for certain what results each exposure will produce until the exposed film has been removed from the camera, sent to a laboratory for development and then, hopefully, returned to the user. This problem has been solved in part by cameras of the type shown in U.S. Pat. Nos. 3,726,198 and 3,796,485. The first of these two patents shows and describes a camera of the self-developing type which is adapted to receive a camera back having a supply of pack film therein, the pack film preferably being of the type designated 108, manufactured by Polaroid Corporation, Cambridge, Massachusetts. The camera back and its associated pack of film is mounted on the back of the camera such that one half of the film is located in position for exposure. Subsequent to the exposure of the first half of the film, the camera back is manually moved so as to locate the other half of the film in position for exposure. After the second half of the film has been exposed, the camera back is returned to its original position and the operator pulls a tab connected to the exposed film so as to position the film for travel between a pair of pressure applying members. The film is then drawn between the pressure applying members so as to enable them to rupture a pod of processing liquid and spread its contents across the exposed surface of the film to initiate the formation of a visible image in a superposed image-receiving sheet, as is well known in the art. The camera shown and described in U.S. Pat. No. 3,796,485 is similar to that just described except that its optical system comprises a twin lens system and circuit which selectively provides for the simultaneous or sequential operation of the twin lens system. This arrangement can form an image in each of two side by side portions of one area of a sheet of film which is one half of the available area of the film sheet when the twin lens system is programmed for sequential operation thus enabling a total of four separate exposures to be made on the film sheet. Alternatively, when the twin lens system is programmed for simultaneous operation, one half of the film sheet is exposed and then the camera back is moved to locate the other half of the film sheet in position for sequential or simultaneous exposure. However, as in the previously described self-developing type camera, the camera back must be manually moved between operations to reposition the film sheet; and the dark slide or opaque cover sheet, which originally protected the film unit from exposure during the loading of the film cassette into the camera, must be manually grasped and removed.

SUMMARY OF THE INVENTION

The instant invention relates to a hand held camera for exposing successive portions of the same light sensitive surface of a film unit and more particularly to such a camera having manually operable means for moving a dark slide from a film cassette during the loading of the latter into a camera so as to locate the film unit in position for exposure. Basically, the camera includes a film chamber for receiving a film cassette containing at least one film unit and an opaque cover sheet located within the cassette between the film unit and an exposure aperture in the film cassette. Entry to the film chamber is provided by a film loading door pivotally connected to a rear wall of the camera. A film cassette positioning apparatus is mounted within and to one side of the film chamber for reciprocal movement so as to position the film cassette at different locations within the film chamber. The positioning apparatus includes a spring for resiliently urging the apparatus toward the loading door. A pawl or latch is pivotally mounted adjacent the positioning apparatus for releasably retaining the latter at first and second locations within the film chamber. Also mounted adjacent the positioning apparatus is a timing cam which is mounted on a fixed rod and is resiliently biased in the same direction as the positioning apparatus. As will be more fully explained hereinafter, the timing cam is adapted to periodically engage the pawl and pivot it to a position wherein the positioning apparatus may move, incrementally, towards the film loading door. A film advancing apparatus is mounted within a forward wall of the film chamber for reciprocal movement. The film advancing apparatus includes a resilient cantilevered arm the free end of which is adapted to extend into the film chamber so as to engage a film unit and move it out of its exposure position. The film advancing apparatus also includes a rack which is meshed with a pinion gear which in turn is adapted to be enmeshed with a rack located on one end of the film cassette positioning apparatus.

The film cassette positioning structure is slidably supported on a rod. One end of the rod is provided with a housing for receiving a shutter actuating button. The other end of the rod is provided with a U-shaped member the legs of which are adapted to straddle the stationary rod which slidably supports the timing cam. In a preferred embodiment, a negator spring has one of its ends fixedly secured to the U-shaped member and its other end fixedly attached to the shaft of a gear which in turn is in mesh with a gear fixedly secured to one end of one of a pair of superposed rollers. Mounted between the shutter actuating button and the timing cam is a switch actuating arm and an elongate member having a latch at one end thereof and a pin at its other end. The latch, in its normal rest position is positioned in a notch in the rod so as to prevent movement of the rod in a direction away from the pair of rollers. The pin extends into an indexing slot formed in the timing cam. The elongate member and the switch actuating arm are pivotally mounted such that when the shutter release button is depressed, it causes the arm and the end of the elongate member having the latch thereon to pivot away from the rod a distance insufficient to remove the latch from the notch but sufficient to trip a pair of switch actuating members to thereby energize the camera's shutter and exposure control circuit. At the same time, the pin is moved within the indexing slot to a position which permits the timing cam to move a slight distance toward the pair of rollers. When the shutter actuating button is released, the arm and the latch move back to their original positions and the pin moves to a position which permits the timing cam to move a further incremental distance toward the rollers for a purpose to be described shortly.

The forward wall of the film chamber is provided with an opening which is in alignment with the axes of the camera's twin lens assembly. A pair of opaque doors are pivotally mounted in closing relation to the opening. Each door closes off substantially one-half of the opening when in its closed position. The doors are coupled to each other such that when one door is in the open position the other door is in the closed position. A door actuating mechanism including a cam follower is coupled to the doors for moving one door to its open position while simultaneously moving the other door into its closed position. The cam follower is resiliently biased into engagement with a cam on the timing cam.

In operation, the camera's film loading door is pivoted to a position wherein a cassette containing at least one film unit and a separate overlying opaque cover sheet is inserted into the film chamber. Preferably, the film unit is of the type shown in FIG. 12 and described in columns 17 and 18 of U.S. Pat. No. 3,647,437. As the film cassette is being inserted into the film chamber its trailing end, i. e., the end of the cassette first inserted into the film chamber, is engaged by a member located within the film chamber for initially limiting the degree of insertion of the film cassette into the film chamber. In this position, a slot in a forward wall and the trailing end wall of the film cassette is located in operative relation with the free end of the cantilevered arm of the film advancing apparatus. The film loading door is then secured in its closed position. During the movement of the loading door toward the closed position the insertion limiting member is moved out of engagement with the trailing end wall of the film cassette, the cassette positioning apparatus is operatively located with respect to the film cassette, and the rollers, which are mounted on the loading door, are positioned adjacent a leading end wall of the cassette such that the bite of the rollers is operatively positioned with respect to an exit slot in the leading end wall of the cassette. Once the loading door has been locked in its closed position, a ring attached to the housing on the rod which slidable supports the cassette positioning structure is manually grasped and pulled in a direction away from the rollers thereby moving the rod in the same direction. The movement of the rod is transmitted to the timing cam and the cassette positioning structure by the U-shaped member so as to move the film cassette and timing cam to their furthermost position within the film chamber. The movement of the rod is also used to drive one of the superposed rollers by the aforementioned negator spring and gears. Initial movement of the cassette positioning structure is transmitted by its integrally formed rack to the rack of the film advancing apparatus by the pinion gear thereby moving the end of the cantilevered arm into engagement with a trailing end of the opaque cover sheet to move its leading edge through the exit slot in the leading end wall of the cassette and then into the bite of the rollers. The rollers continue the advancement of the cover sheet to the exterior of the camera. With the film cassette thus located at its furthermost position within the film chamber and the opaque cover sheet removed, a first predetermined area of the film unit, i.e., the lower third of the film unit is located in position for exposure. However, it should be noted that one of the two doors in the front wall of the film chamber is in its closed position thereby permitting exposure of only one-half of the predetermined area of the film unit.

The camera is now ready for the first exposure. Upon depression of the shutter actuating button, the switch actuating arm and the elongate member are pivoted such that they move into engagement with a pair of switch actuators to actuate the camera's shutter thereby exposing the one half of the first predetermined area of the film unit which is located behind the half of the opening which is not closed by one of the doors. Simultaneously therewith, the pin on the other end of the elongate member is pivoted to a position within the indexing rack which enables the timing cam to move a short distance towards the rollers. Upon releasing the shutter actuating button, a spring returns the arm and the elongate member to their original positions thereby moving the pin to a position which enables the timing cam to again move towards the rollers. During this second movement of the timing cam towards the rollers, the cam follower follows the cam on the timing cam so as to move the two doors such that the exposed area is now covered by one of the doors and the remaining door is moved to an open position preparatory to the exposure of the second half, i.e., the remaining half of the first predetermined area of the film unit. Depression of the shutter actuating button now results in the second half of the first predetermined area being exposed. However, as the shutter actuating button is being released, the pin on the elongate member is allowed to move to a position which enables the timing cam to move into engagement with the pawl. This engagement results in the pawl being moved to a position wherein the spring associated with the cassette positioning apparatus moves the cassette positioning apparatus so as to locate a second predetermined area of the film unit in alignment with the opening. At this point, the pawl again engages and maintains the cassette positioning apparatus at a second location within the film chamber. Simultaneously with the latter movement the cam follower follows the cam so as to relocate the two doors in their original position. The third actuation of the shutter actuating button results in one half of the second predetermined area of the film unit being exposed and the various other elements repeating the steps set forth relative to the exposure of the first half of the first predetermined area of the film unit. The sequence of the steps subsequent to the exposure of the second half of the second predetermined area is similar to that described with reference to the exposure of the second half of the first predetermined area. In other words, upon release of the shutter actuating button after the fourth exposure has been completed, the pin on the elongate member has been moved to a position where the timing cam can move to a position whereat it again engages and moves the pawl to a position which enables the cassette positioning apparatus to move to a third location within the film chamber whereat a third and final predetermined area of the film unit is now located in position for sequential exposures. This third location corresponds with the position that the film cassette was in when the film loading door was first closed. After the fifth and sixth exposures, that is to say, first one half and then the other half of the third predetermined area of the film unit, the latch on the elongate member is automatically moved to a position wherein it is fully withdrawn from the notch in the rod. At this time, and only at this time, the ring, which is coupled to the rod, may be pulled in a direction away from the rollers so as to drive the one roller via the negator spring and the aforementioned gears as described hereinabove. This movement of the rod is transmitted to the cassette positioning apparatus and the film advancing apparatus to relocate the cassette positioning apparatus at its first location within the film chamber while simultaneously driving the film advancing apparatus so that to move the fully exposed film unit through the exit slot in the leading end wall of the film cassette and into the bite of the rollers. The rotation of the driven roller is transmitted through the film unit to the second roller thereby enabling the rollers to continue the advancement of the exposed film unit towards the exterior of the camera while simultaneously rupturing a pod of processing liquid associated with the film unit so as to initiate the formation of a visable image within the film unit. The operator of the camera may then peel an opaque layer from a transparent support which forms the rear surface of the exposed film unit and view the six exposures. Later the six exposures or frames may be cut and mounted for individual viewing in a conventional viewer or projector or the film unit as a whole may be placed in a viewer or projector and the individual frames sequentially aligned with the optics of the apparatus for viewing. Alternatively, instead of the film unit producing a color transparency, it could be of the type which produces a reflective print such as described in U.S. Pat. No. 3,594,165.

An object of the invention is to provide a camera with manually operable means for automatically removing an opaque sheet from covering relation with an unexposed film unit as the film unit is being moved into position for exposure.

Another object of the invention is to provide a handheld camera of the self-developing type with means for moving an opaque cover sheet from a film cassette and into the bite of a driven roller assembly while simultaneously relocating the film cassette within the camera's film chamber for exposure of an underlying film unit.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of a camera which incorporates the instant invention, the camera being shown in a folded condition;

FIG. 2 is a perspective view of the camera of FIG. 1 shown in its extended operative condition;

FIG. 4a is a partial cross-sectional view of a portion of FIG. 4 showing part of a film advancing apparatus and its relation to a film cassette;

FIG. 12 is an exploded perspective view of a section of the apparatus for actuating the camera's shutter assembly.

DETAILED DESCRIPTION OF THE INVENTION

Figure 3:
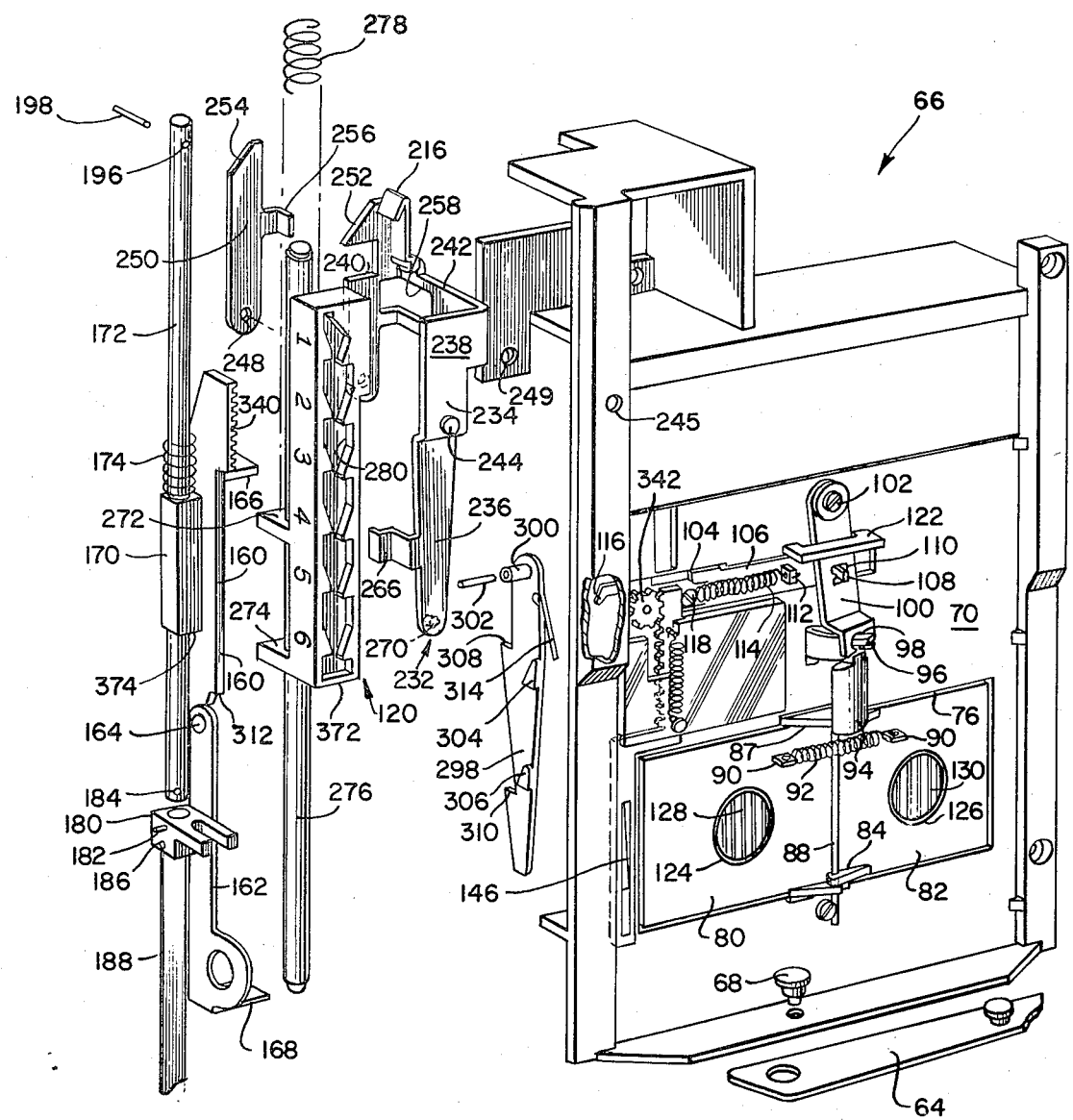
FIG. 3 is an enlarged partially exploded perspective view of various components of the camera.

Reference is now made to FIGS. 1 and 2 of the drawings wherein is shown a hand-held compact camera 10, preferably of the self-developing type. The camera 10 includes a first housing section 12 having a forward wall 14, a pair of side walls 16 and 18, a rear wall 20 and a film loading door 22 pivotally coupled to the rear wall 20 by a hinge 24. Each of the side walls 16 and 18 and each of the side walls 26 (only one being shown) of the film loading door 22 is provided with a longitudinally extending inwardly facing groove 28. A second housing section 30 includes a rear wall 32, a top wall 34 having a socket 36 therein for receiving a source of artificial illumination, and a pair of side walls 38, only one of which is shown. Each of the side walls 38 is provided with a length of reduced area 40 having a longitudinally extending rib 42 thereon which is adapted to be slidably received by the aligned groove 28 in the side walls of the first housing section 12 and the film loading door 22. Also, the left side wall 40 is provided with an aperture of film counter window 44. A third housing section 46 is pivotally coupled to the second housing section 30 for movement between its extended position, as shown in FIG. 2, wherein it defines an acute angle with the second housing section 30, and its folded or collapsed position, as shown in FIG. 1, wherein it is substantially parallel with the second housing section 20 and in substantially the same plane as the first housing section 12. The third housing section 46 includes a forward wall 48 having a viewfinder window 50 therein which is in alignment with an eyepiece 52 located in the rear wall 32 of the second housing section 30. Extending forwardly from a lower portion of the wall 48 is a raised section 54 which together with the forward wall 14 of the first housing section 12 defines an enclosure for protecting the camera's lens and shutter assembly when the camera is folded. The lens and shutter assembly is mounted on the forward wall 48 and includes a pair of objective lenses 56 and 58 whose optical axes are substantially parallel and are perpendicular to the plane of the rear wall 32 of the second housing section 30. Extending rearwardly from the forward wall 48 are a pair of laterally disposed side walls 60, only one of which is shown. The exterior of the camera 10 is completed by a collapsible opaque bellows 62 which is suitably connected in a light tight manner between the housing sections 30 and 46. An erecting link 64, see FIG. 3, having one of its ends pivotally coupled to an inner frame member 66 by a pin 68 and its other end coupled to a laterally extending slot (not shown) at the lower end of the second housing section 30, is provided for releasably maintaining the latter in its extended condition.

Although the camera shown in FIG. 2 is compact, it can be readily seen that this compactness is optimized when the third housing section is pivoted into its folded position and then the two housing sections are partially slid as a unit into the first housing section 12 so as to assume the configuration shown in FIG. 1.

Figure 4:
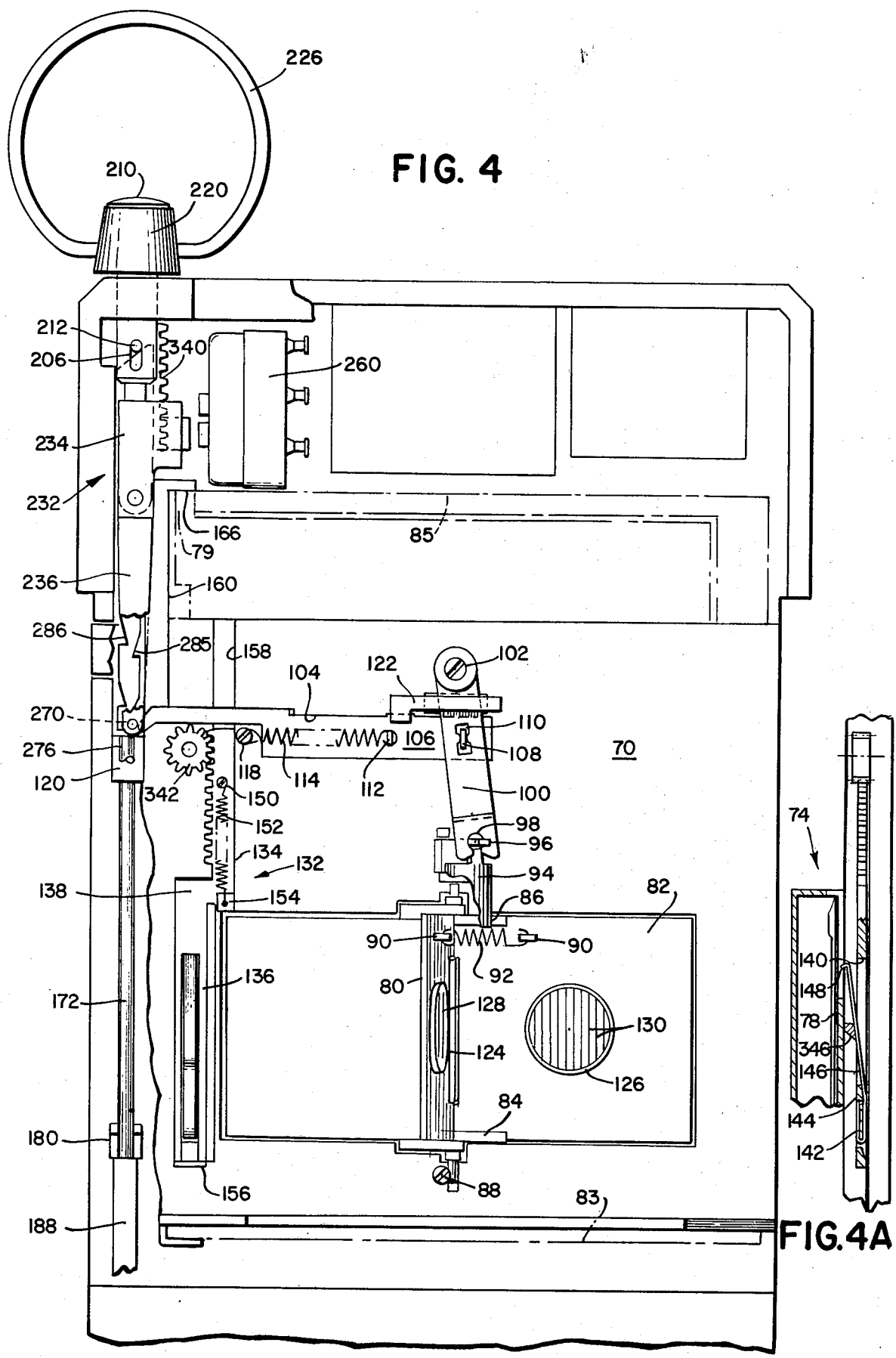
FIG. 4 is an enlarged elevational view of a portion of the interior of the camera.
Figure 5:
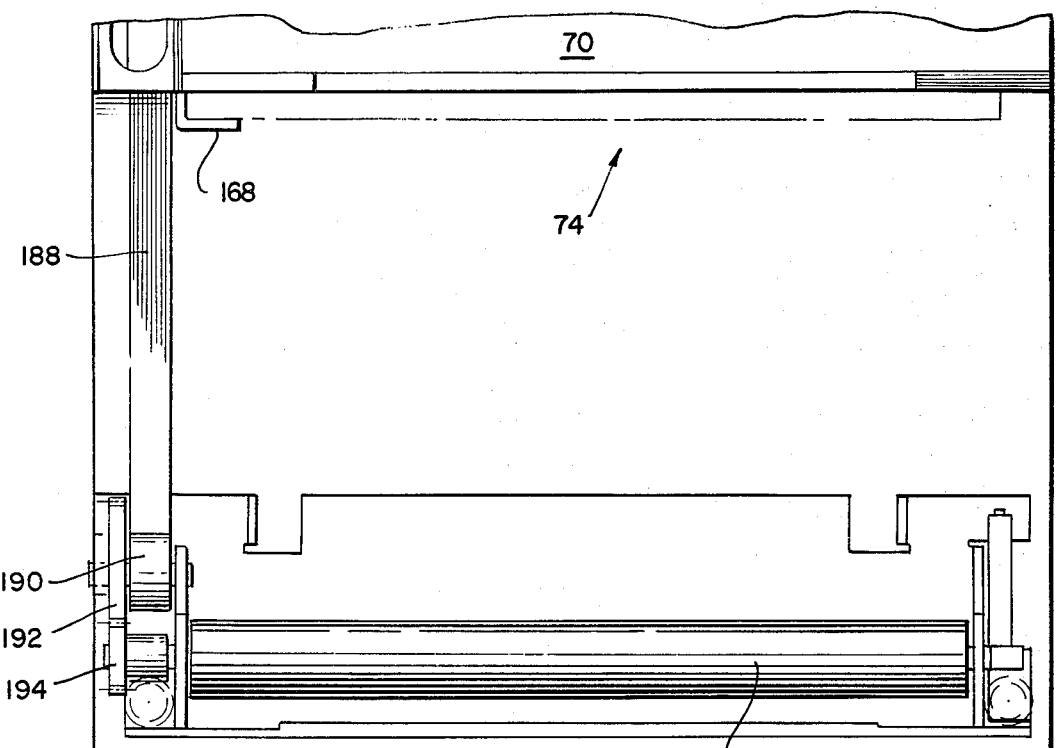
FIG. 5 is a view similar to FIG. 4 showing the remainder of the portion shown in FIG. 4.
Figure 9:
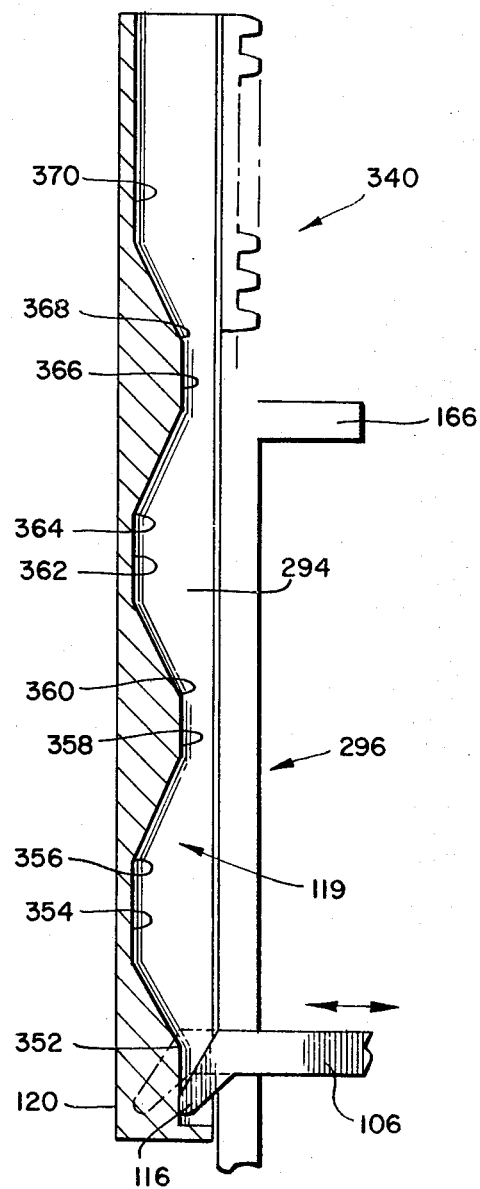
FIG. 9 is a cross-sectional view of the timing cam taken along the line 9—9.

Reference is now made to FIGS. 3 and 4 wherein various internal components of the camera are shown. The inner frame member 66 includes a wall 70 which together with the rear wall 32, the loading door 22 and the side walls 16, 18, 26 and 38 define a film chamber 72, see FIG. 10, for receiving a film cassette 74. The inner frame member 66 is provided with a rectangular opening 76 having dimensions substantially equal to the sum of the areas of any two laterally adjacent portions of a film unit 78, e.g., portions A and B, as shown in FIG. 11. The opening 76 is adapted to be closed by a pair of opaque doors 80 and 82 when the camera is in the collapsed or folded position. The doors 80 and 82 are shown in FIG. 3 in their closed positions and are shown in FIG. 4 with the door 80 in the open position and the door 82 in its closed position. The door 82 is provided with a pair of projections 84 and 86 having suitable apertures therein for receiving a pivot pin 88. The door 80 is provided with a similar pair of projections 87 or raised portions located just outboard of the projections 84 and 86 for receiving the pivot pin 88. Each of the doors 80 and 82 is also provided with a lug 90 for anchoring the opposite ends of a spring 92. A door locator 94 is also mounted on the pivot pin 88 such that when it is in the position shown in FIG. 4 it is located to the right of the pivot pin 88 and in contact with the door 82. The left side of the door locator, i.e., the portion cut away in FIG. 4, is in engagement with the door 80. The door locator 94 is constructed such that the included angle between the doors 80 and 82 always define an angle greater than ninety degrees. As can be seen in FIG. 4, the door 80 is at a slight angle to a plane perpendicular to the wall 70 and parallel with the pivot pin 88. For this reason, the door 80 will be automatically cammed into its closed position by the housing section 46 during the folding of the camera. The door locator 94 is provided with a projection 96 which is adapted to be received within an aperture 98 located within one end of a link 100. The opposite end of the link 100 is pivotally connected to the wall 70 by a stud 102. A laterally extending recess 104 is provided within the wall 70 for slidably receiving a cam follower 106. One end of the cam follower 106 includes a projection 108 which is adapted to be received within an aperture 110 in the link 100 for converting linear motion of the cam follower 106 into pivotal movement of the link 100. The cam follower 106 further includes a flange 112 for securing one end of a spring 114 so as to resiliently bias the cam follower 106 to the left, as viewed in FIG. 4, thereby maintaining its free end 116 in engagement with a cam 119 (see FIG. 9) on a timing cam 120 to be described shortly. The other end of the spring 114 is anchored to the wall 70 by a screw 118. Extending upwardly from the wall 70 and overlying the link 100 is a U-shaped bracket 122 for substantially insuring that the link 100 pivots in a plane parallel with the wall 70.

Referring back to the doors 80 and 82, it will be noted that each is provided with a photocell 124 and 126 having a plurality of louvers 128 and 130 on their faces. Since the lateral distance between the two objective lenses 56 and 58 is relatively short, each photocell "reads" approximately the same percentage of a given portion of the total scene to be photographed. Further, although each photocell 124 and 126 is displaced from the focal plane by the thickness of its respective door 80 and 82 they still may be defined as focal plane photocells since the thickness of each door is approximately only 0.8 mm. The louvers 128 and 130 function to block the scene light from its associated photocell when its associated door is in the open position. Suitable means, not shown, are provided for electrically connecting the photocells 124 and 126 into the camera's automatic exposure control.

The camera 10 includes a film advancing apparatus for moving an uppermost sheet like element from the film cassette 74, i.e., either an opaque cover sheet 75 which is initially located between the uppermost film unit 78 in the film cassette and the wall 77 of the film cassette for preventing premature exposure of the uppermost film unit during loading, or the uppermost film unit when the opaque cover sheet has been previously removed. Specifically, the film advancing apparatus includes a reciprocally mounted member 132 having first and second laterally offset arms 134 and 136 integrally connected by a central portion 138. The arm 136 includes a elongate opening 140 therein. Extending across the opening 140 is an integral portion 142 (see FIG. 4a) having a slot 144 therein for receiving one end of a resilient film engaging member 146. As can be readily seen in FIG. 4a, the member 146 extends fully around the front and top of the integral portion 142 and terminates in a cantilevered film engaging portion 148. As will be more fully described later, the film engaging portion 142 is adapted to extend into an opening 79 in the film cassette 74 and engage the trailing edge of only the uppermost sheet-like element and move it from the film cassette via an exit opening 81. The arm 134 includes an upstanding member 150 which provides a means for securing one end of a spring 152. The wall 70 is provided with a screw 154 for anchoring the other end of the spring 152 for resiliently biasing the film advancing apparatus in the direction of the movement of the film unit 78. The wall 70 is provided with an elongate recess 156 for slidably receiving the arm 136 and a second elongate recess 158 for slidably receiving the arm 134.

Mounted adjacent one side of the film chamber 72 is a film cassette positioning structure including first and second arms 160 and 162 which are pivotally connected to each other by a pin 164. The arm 160 includes an inwardly directed flange 166 which cooperates with another inwardly directed flange 168 extending from the arm 162 for capturing the leading end wall 83 and the trailing end wall 85 of the film cassette 74. The arm 160 is provided with a hollow guide 170 for slidably receiving a rod 172 so as to guide the film cassette positioning structure for reciprocating movement. A spring 174 which encircles the rod 172 has one of its ends in engagement with the guide 170 and its opposite end in engagement with a stationary part of the interior of the camera so as to resiliently bias the film positioning structure towards a pair of rollers 176 and 178. A U-shaped member 180 is secured to the lower end of the rod 172 by a pin 182 which is adapted to be secured within a hole 184 in the rod 172. The U-shaped member 180 also includes a recess 186 for securably retaining one end of a negator spring 188. The other end of the negator spring 188 is coiled around and secured to the boss 190 of a gear 192. The gear 192 in turn is enmeshed with a gear 194 which is fixedly secured to one end of the roller 176. The upper end of the rod 172 is provided with a hole 196 for receiving a pin 198 so as to secure the rod 172 to a shutter release button housing assembly 200.

Figure 6:
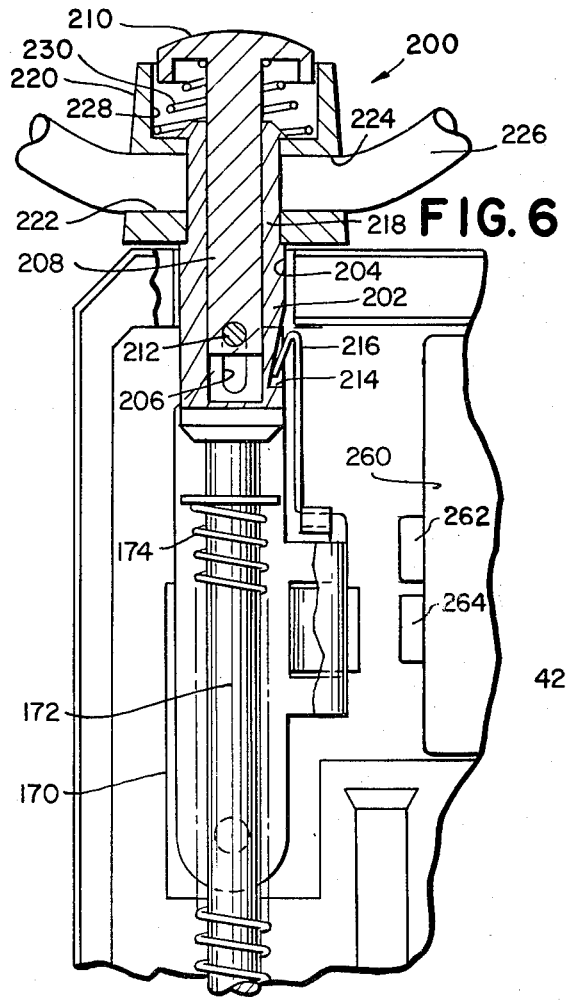
FIGS. 6 and 7 are enlarged cross-sectional views of portions of FIG. 4.

As best shown in FIG. 6, the shutter release button housing assembly includes an elongate member 202 having a generally rectangular configuration in cross section which is fixedly secured to the rod 172 by the aforementioned pin 198 and extends through an opening 204 in the top wall 34 of the camera. The member 202 is hollow and has a slot 206 in one wall thereof. Mounted within the member 202 is the shank 208 of a shutter release button 210. The lower end of the shank 208 includes a pin 212 which extends into and through the slot 206 to the exterior of the member 202. An outer face of the member 202 includes a notch or recess 214 for receiving a latch 216. The upper portion of the member 202 is received by an opening 218 in a housing 220. The housing 220 in turn is provided with a pair of openings 222 and 224 for receiving the free ends of a ring 226. Mounted within an annular recess 228 in the housing 220 is a spring 230 which encircles the shank 208 for resiliently biasing the shutter release button 210 upwardly until its associated pin 212 tops out in the slot 206.

Reference is now directed to FIGS. 3 and 12 of the drawings wherein is shown a portion of the structure for actuating the camera's shutter assembly. This structure includes an elongate member 232 having first and second opposite ends 234 and 236, respectively. The first end 234 includes a pair of flange 238 and 240 integrally connected by a flange 242. The spacing between the flanges 238 and 240 is sufficient to accommodate the uppermost portion of the first arm 160 of the film cassette positioning structure when it is in the position shown in FIG. 4. The elongate member 232 is provided with an outwardly extending stud 244 intermediate its ends which is adapted to be rotatively received by an aperture 245 in the innerframe 66 so as to enable pivotal movement of the elongate member 232. The flange 240 is provided with an oppositely facing stud 246 which is adapted to be received by an aperture 248 in an arm 250 and by an aperture 249 located in the frame 66. The flange 240 and the arm 250 are of substantially the same length and each includes at one end thereof an inclined surface 252 and 254, respectively, which is adapted to be engaged, simultaneously, by the pin 212 so as to pivot the elongate member 232 and the arm 250 in a clockwise manner, as viewed in FIGS. 4 and 12. The arm 250 also includes an upwardly turned flange 256 which is adapted to fit within an aperture 258 which extends along a portion of the interconnecting faces of the flanges 240 and 242. In its normal position, the flange 256 lies in the plane of the flange 242. Mounted adjacent to the first end 234 of the elongate member 232 and to the flange 256 of the arm 250 is a switch box 260 which when actuated initiates operation of the camera's shutter and exposure control circuit. The switch box 260 includes first and second switch actuating members 262 and 264. The switch actuating member 262 is adapted to be engaged and depressed by the surface of the flange 242 located on the right side of the aperture 258 to close one of two switches located in series while the other of the two switches is adapted to be closed upon the flange 256 engaging and depressing the switch actuating member 264. It is only when the two switches in series are closed at the same time that the shutter and exposure control circuit is actuated.

The second end 236 of the elongate member 232 is provided with a rearwardly extending flange 266 which is shaped to fit within a recess 268 (see FIG. 2) in the left side wall 40 of the camera, and a rearwardly extending pin 270 which is adapted to enter a track in the timing cam 120 to control its movement.

With reference to FIGS. 3, 4, 8 and 9, the timing cam 120 includes a pair of extensions 272 and 274 having apertures therein for slidably mounting the timing cam on a stationary rod 276 whose lower end is received in the bite of the U-shaped member 180. A spring 278 encircles the rod 276 and has one of its ends in engagement with the extension 272 and its other end in engagement with a stationary part of the camera for resiliently biasing the timing cam 120 towards the rollers 176 and 178. The forwardly facing surface, as viewed in FIG. 3, of the timing cam 120 is provided with a slot 280 having a plurality of offset projections 281-292 inclusive. The rearwardly facing portion of the timing cam 120 is provided with a chamber 294 (see FIG. 9) having an open side 296 through which the cam follower 106 extends so as to engage the cam 119.

Figure 7:
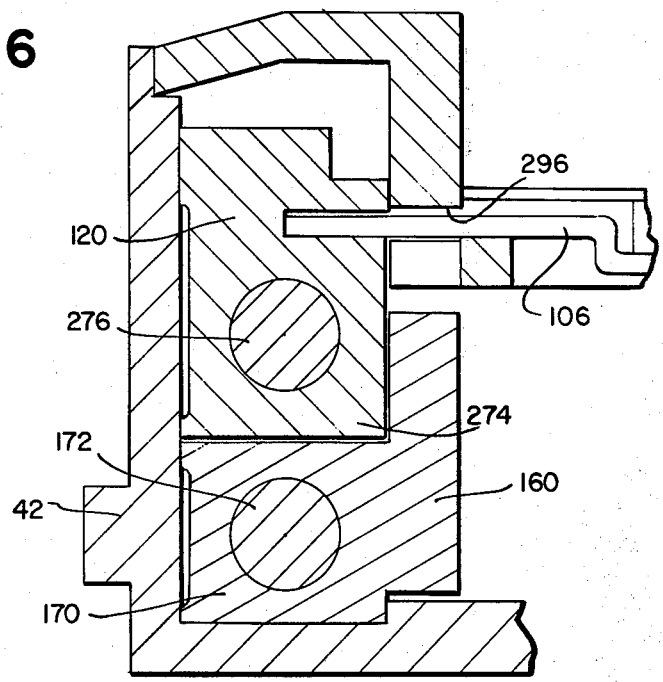

As can be seen in FIG. 7, the timing cam 120 is mounted above the film cassette positioning structure which includes the arm 160. Mounted adjacent to one side of the timing cam 120 and above the arm 160 is a latch 298 which functions to limit the extent to which the film cassette positioning structure may move the film cassette 74. The latch 298 includes a boss 300, for receiving a pin 302 for pivotally connecting the latch 298 to the inner frame 66, a pair of outwardly extending cams 304 and 306, and a pair of stop members 308 and 310 which are adapted to engage an end 312 on the arm 160 for arresting its movement. The latch 298 is biased into engagement with the arm 160 by suitable means such as a spring 314.

Figure 10:
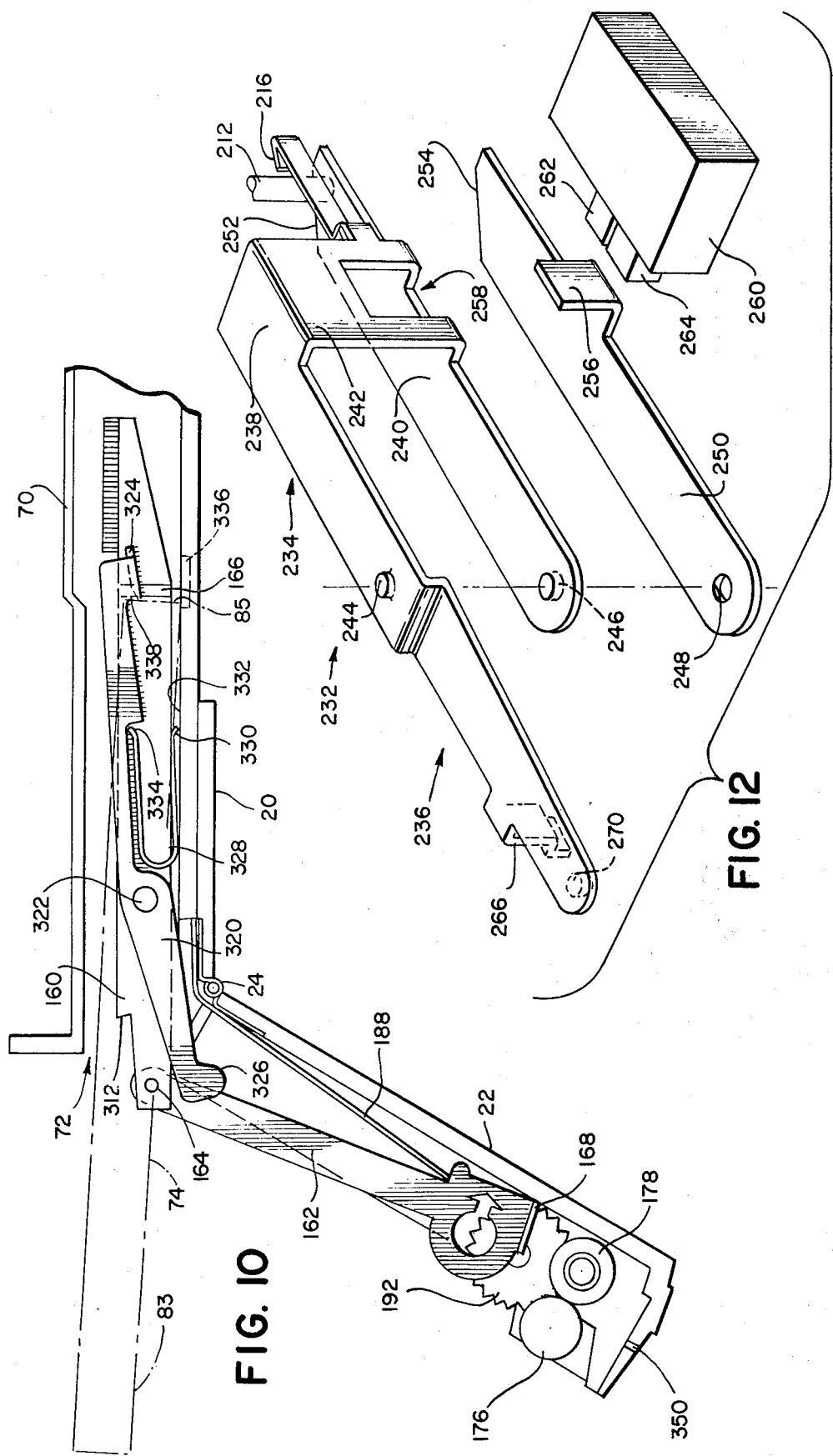
FIG. 10 is an enlarged cross-sectional view of a portion of the camera shown with its film loading door in an open or loading position.
Figure 11:
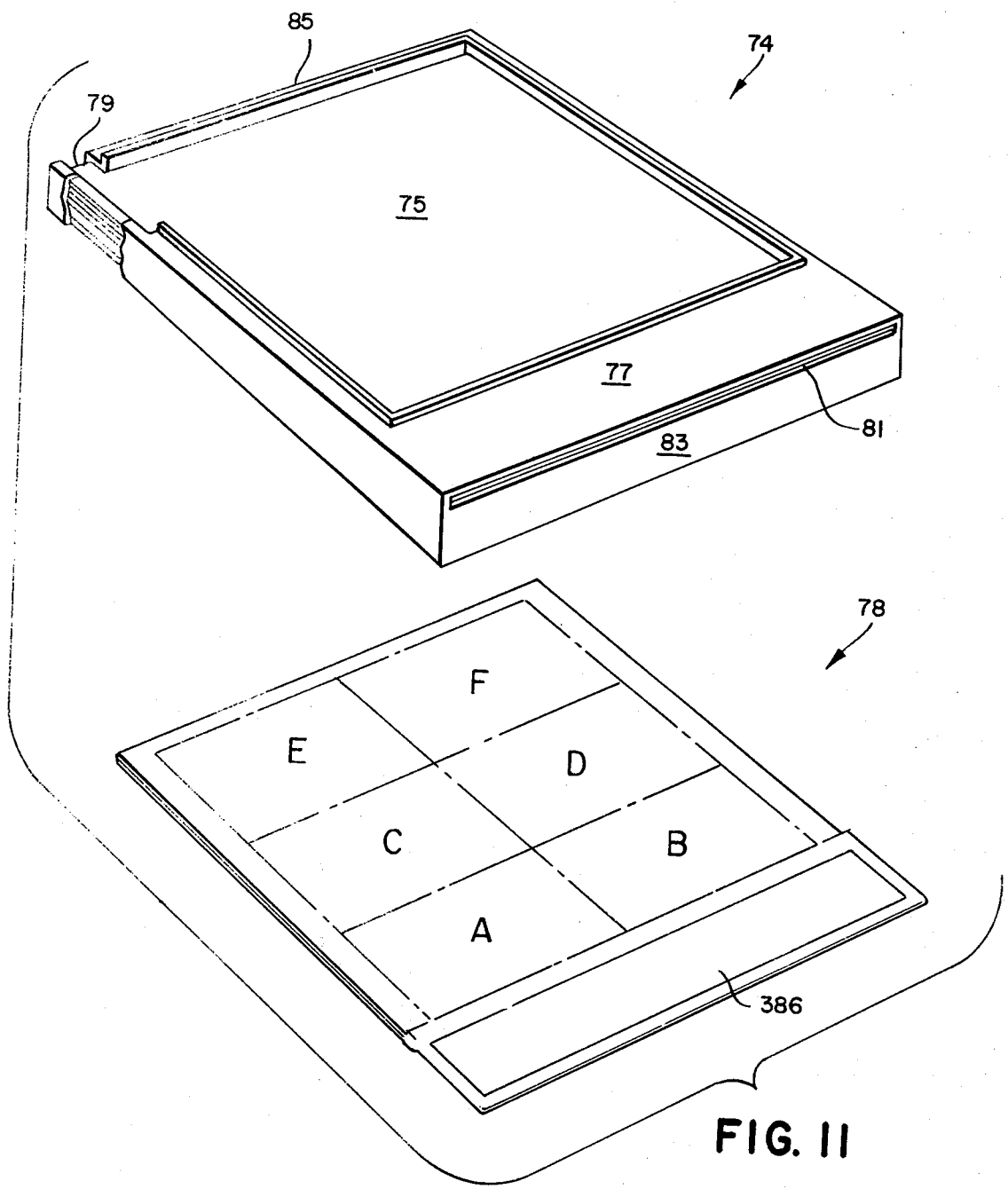
FIG. 11 is an enlarged perspective view with portions broken away of a film cassette for use with the camera of the instant invention, one of the film units being shown outside of the film cassette for purposes of clarity.

As can been seen in FIG. 10, the film cassette positioning structure including the arms 160 and 162 and their associated flanges 166 and 168 is located at its closest point to the rollers 176 and 178. If the loading door 22 were open, as shown, and a film cassette were to be inserted into the film chamber 72, the only structure that would partially function to properly position the film cassette would be the flange 166. However, since the spring 174 is the only force which is holding the film cassette positioning structure in this position it may be possible for the user to push the film cassette with a force sufficient to move the flange 166 to the right, as viewed in FIG. 10 until the cassette positioning structure was again latched in position by the latch 298.

Thus positioned, the film cassette would not be located properly with respect to the film advancing means 132 and its film engaging end 148. This problem is obviated by operatively disposing within the film chamber 72 a means for initially engaging and limiting the degree of insertion of the film cassette into the film chamber. Specifically, these means take the form of a lever 320 which is pivotally mounted within a recess in the right side wall of the film chamber by a pin 322, i.e., the side opposite the film positioning structure. One end of the lever 320 includes an inwardly directed arm 324 while the opposite end of the lever 320 includes a protuberance 326. A spring 328 is mounted adjacent the side wall of the film chamber such that a first end 330 is engaged with a rear wall 332 of the film chamber and its second end 334 is in engagement with the lever 320 so as to resiliently bias the latter in a counterclockwise direction. Normally, engagement between the loading door 22 and the protuberance 326 maintains the arm 324 within the recess 336 such that it does not interfere with the movement of the film cassette 74 within the film chamber 72. When the loading door is opened, the lever 320 is pivoted in a counterclockwise direction by the spring 328 until the arm 324 reaches the position shown in FIG. 10 at which time its movement is stopped by suitable means, not shown. It will be noted that when the arm 324 is so located, its end 338 is located just to the left of the flange 166 thereby limiting the insertion of the film cassette 74 to the position shown in broken lines in FIG. 10. As the loading door 22 is pivoted into its closed position, it engages the protuberance 326 and pivots the lever 320 until the arm 324 again enters the recess 336 thereby properly locating the flange 166 adjacent to the trailing end wall 85 of the film cassette 74. Simultaneously therewith, the loading door 22 also pivots the arm 162 in a clockwise direction until its flange 168 is located immediately adjacent the leading end wall 83 of the film cassette 74.

OPERATION

Figure 8:
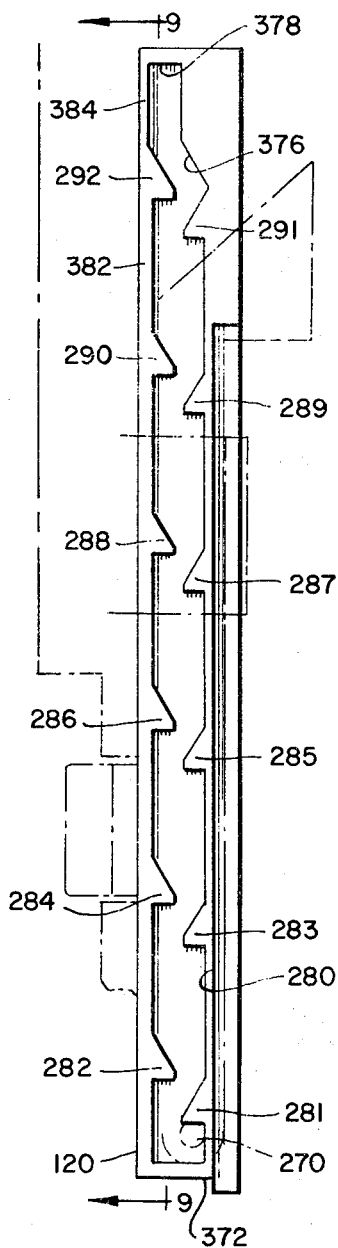
FIG. 8 is an enlarged elevational view of a timing cam.

Initially the camera is loaded by rotating the film door 22 into its open position as shown in FIG. 10. The film cassette 74 is then inserted into the open end of the film chamber 72 trailing end 85 first. The insertion of the film cassette 74 is stopped by the arm 324 thereby properly positioning the flange 166 adjacent to the trailing end wall of the film cassette. The film loading door 22 is then rotated in a clockwise direction into its closed position such that the flange 168 of the arm 162 is now located adjacent the leading end wall 83 of the film cassette 74. The operator next grasps the ring 226 and pulls it away from the top wall 34 of the camera. This action results in the rod 172, the guide 170 and the remainder of the film cassette positioning structure 160 and 162 and their respective flanges 166 and 168 moving away from the rollers 176 and 178. This movement is used to impart linear movement to the film advancing apparatus 132 by means of a rack 340 which is located on the arm 160 which initially is in mesh with a gear 342 which in turn is in mesh with a rack 344 formed on the arm 134 of the film advancing means. Since the arm 134 was originally located above the cam follower 106 and in the recess 158, clockwise rotation of the gear 342 will cause the arm 134, the arm 136, and its associated canterlevered film engaging member 146 to move towards the rollers 176 and 178. This latter movement results in the film engaging portion 148 engaging the trailing edge of the topmost element in the film cassette 74 which at this time would be an opaque cover sheet which functions to prevent exposure of a film unit during loading of the cassette into the camera. The movement of the rod 172 is also used to drive the roller 176 through its connection with the negator spring 188 and the gears 192 and 194. Also the movement of the rod 172 is transmitted to the timing cam 120 by the U-shaped member 180 thereby moving the timing cam into the position shown in FIG. 4. As the film engaging portion 148 advances the opaque cover sheet into the bite of the rollers 176 and 178, a portion thereof engages a caming surface 346 (see FIG. 4A) so as to lift the film engaging portion 148 to a position wherein it can no longer enter the film cassette by way of its opening 79. In other words, when the ring 210 is pulled, the rod 172 drives the rollers 176 and 178 and the film advancing apparatus 132 while simultaneously moving the film cassette away from the rollers. The rollers continue the advancement of the opaque cover sheet to the exterior of the camera by way of an opening 350 in the film loading drawer 22. When the rod 172 has completed its upward stroke the various other elements of the camera and film cassette are located in the positions shown in FIG. 4. The film cassette positioning structure is maintained in the position shown in FIG. 4 by reason of the engagement between the stop member 308 and the surface 312 on the arm 160. The timing cam is maintained in the up position by reason of the engagement between the pin 270 on the arm 236 of the elongated member 232 and the projection 281, as shown in FIG. 8. The ring 226 is then used to push the rod 172 back into its original position within the camera thereby removing the U-shaped member 180 from its engagement with the end of the timing cam 120 and enabling the latch 216 to move fully into the recess 214. Also, the negator spring 188 now winds a portion of itself onto the hub 190. The film cassette 74 is now positioned at a first location within the film chamber 72 in preparation for the exposure of a first predetermined area of the top most film unit 78 located within the film cassette 74.

The first predetermined area of the film unit is identified in FIG. 11 as portions A and B. After the subject has been properly framed in the viewfinder 52, the shutter release button 210 is depressed thereby moving the pin 212 into engagement with the inclined surfaces 252 and 254 thereby rotating their associate structures in a clockwise direction to actuate the switch within the switch box 260 thereby energizing the camera's shutter and exposure control circuit. The light from the scene enters the camera through both lenses 56 and 58 and by a single shutter associated therewith. However, since at this time the opaque door 82 is in its closed position, as shown in FIG. 4, only the portion A of the film unit 78 will be exposed. The photocell 126 associated with the door 82 reads the light which is available at the focal plane and terminates the exposure at the appropriate time. Simultaneously with the rotation of the elongate member 232 in a clockwise manner, the pin 270 on the arm 236 moves to the left, as viewed in FIG. 8, so as to be out of engagement with the projection 281. With the pin 270 so located, the spring 278 moves the timing cam downwardly until the projection 282 engages the pin 270. At the end of this incremental movement of the timing cam 120, the end 116 of the cam follower 106 will have traversed a dwell portion of the cam surface 119 and come to a stop at the location identified as 352. Upon release of the shutter button 210, the spring 230 returns the button to its original position thereby moving the pin 212 upwardly so as to allow a spring (not shown) associated with the switch actuating members 262 and 264 to return the arm 250 and the elongate member 232 to the positions shown in FIGS. 4 and 6. As the elongate member 232 pivots in a counterclockwise direction back into its original position its pin 270 moves to right such that it is now in alignment with the projection 283. The spring 278 now moves the timing cam 120 a second incremental distance toward the rollers 176 and 178 until it is stopped by the projection 283 moving into engagement with the pin 270. During this second incremental movement of the timing cam 120, the end 116 of the cam follower 106 will have traversed the portion of the cam surface 119 between the points 352 and 354 thereby allowing the spring 114 to move the cam follower 106 to the left into the dotted line position thereby closing the door 80 and opening the door 82 in preparation for the exposure of the portion B of the first predetermined area of the film unit. A second depression of the shutter release button 210 again results in the elongate member 232 and the arm 250 pivoting a clockwise manner so as to depress the switch actuating members 262 and 264 to initiate an exposure cycle as described hereinabove. During this movement of the elongate member 232 its associated pin 270 moves to the left, as viewed in FIG. 8, out of engagement with the projection 283 so as to enable the timing cam 120 to move another incremental distance towards the rollers 176 and 178 until the projection 284 moves into engagement with the pin 270 thereby arresting the movement of the timing cam. During this movement, the end 116 of the cam follower 106 moves from point 354 to point 356 on the cam surface 119, i.e., a dwell portion of the cam. When the button 210 is released the elongate member 232 pivots in a counterclockwise direction thereby moving the pin 270 out of engagement with the projection 284 and into alignment with the projection 285. Again, the timing cam 120 moves towards the rollers 176 and 178 until the projection 285 engages the pin 270. Simultaneously therewith, the end 116 of the cam follower 106 will move from the point 356 to the point 358 on the cam surface 119 thereby causing the cam follower 106 to move to the right thereby opening the door 80 and closing the door 82. As the projection 285 moves into engagement with the pin 270, the leading end 372 of the timing cam 120 moves into engagement with the cam 304 thereby pivoting the latch 298 in a clockwise direction, as viewed in FIG. 3, thereby moving the surface 308 out of engagement with the surface 312 on the arm 160. The film cassette positioning structure including the arms 160 and 162 and their associated flanges 166 and 168 are now free to move the cassette to a second location within the film chamber 72 so as to position a second predetermined area of the film unit in position for exposure.

As the cassette approaches the second location, the surface 312 of the arm 160 moves into engagement with the surface 310 on the latch 298 thereby arresting any further movement of the film cassette positioning structure. The shutter actuating button 210 is then depressed to initiate exposure of the portion C of the second predetermined area of the film unit, i.e., portions C and D. The various elements of the camera perform in substantially the same manner as described above with reference to the exposure of the portion A of the first predetermind area of the film unit. When the portion D of the film unit is exposed, the pin 270 will move out of engagement with the projection 287 into alignment with the projection 288 thereby allowing the spring 278 to advance the timing cam 120 another incremental distance towards the rollers 176 and 178. Release of the shutter button 210 results in the pin 270 moving to the right, as viewed in FIG. 8, out of engagement with the projection 288 and into alignment or interference with the projection 289. The spring 278 again moves the timing cam another incremental distance towards the rollers 176 and 178. During this latter movement of the timing cam 120, the end 116 of the cam follower 106 will have moved from point 364 to point 366 on the cam surface 119 thereby again changing the position of the doors 80 and 82 as previously described. Further, this latter movement of the projection 289 into engagement with the pin 270 results in the leading end 372 of the timing cam 120 moving into engagement with the cam 306 on the latch 298 to again pivot the latter in a counterclockwise direction thereby removing the surface 310 from latching engagement with the surface 312 on the arm 160 thereby enabling the spring 174 to move the film cassette positioning structure towards the rollers 176 and 178 to position the film cassette at a third location within the film chamber 72. As the film cassette approaches the third location, the lower end 374 of the guide 170 of the film cassette positioning structure engages the U-shaped member 180 thereby arresting movement of the film cassette. Also as the film cassette positioning structure positions the film cassette at its third location within the film chamber 72, the rack 340 on the end of the arm 160 engages the pinion gear 342 and rotates it in a counterclockwise direction thereby driving the film advancing apparatus 132 away from the rollers 176 and 178. This movement results in the film engaging portion 148 moving from its forward position, as shown in FIG. 4a, wherein it is located ahead of and above the trailing edge of the film unit, to its most rearward position wherein it is located just rearwardly of the trailing edge of the film unit and in substantially the same plane as the film unit. The third predetermined area of the film unit 78, i.e., portions E and F are now located in position for sequential exposure. Again, during the exposure of the portion E of the third predetermined area of the film unit 78, the various elements of the camera co-act as described above with reference to the exposure of the portions A and C. During the exposure of the portion F, the pin 270 moves out of engagement with the projection 291 and into alignment with the projection 292. During this movement of the pin 270, the timing cam 120 again moves an incremental distance towards the rollers 176 and 178. Upon release of the shutter button 210, the pin 270 will move to the right, as viewed in FIG. 8, so as to be located in alignment with a caming surface 376. The spring 278 again moves the timing cam 120 towards the rollers 176 and 178 thereby results in the caming surface 376 engaging the pin 270 so as to move it to the left as viewed in FIG. 8 where it finally bottoms out at the button 378 of the slot. During this latter movement, the pin 270 and its associated elongate member 232 is pivoted in a clockwise manner to fully remove the latch 216 from the recess 214 so as to enable the operator to grasp the ring 226 and pull it and the rod 172 away from the top surface 34 of the camera.

At this time, it should be noted that the side wall 382 of the timing cam 120 has a portion 384 of reduced thickness. The reason for this is as follows. During each movement of the pin 270 to the left, as viewed in FIG. 8, its associated elongate member 232 having the latch 216 mounted thereon is rotated through an angle which is insufficient to completely remove the latch 216 from the recess 214. However, because of the reduced thickness of the portion 384, the pin 270 is now able to move more to the left than heretofore thereby rotating the elongate member 232 through an angle sufficient to remove the latch 216 from the recess 214. Also, it will be noted that even through the elongate member 232 rotates in a clockwise direction to a greater extent than previous rotations, only the switch actuating member 262 is depressed. The arm 250 is not moved during this latter rotation of the elongate member 232 by reason of the opening 258 in the flange 242. Accordingly, since only the switch actuating member 262 is depressed, only one of the two switches located in series within the switch box 260 is closed and the shutter and exposed control circuit of the camera are not energized.

The fully exposed film unit is now ready to be processed. As described hereinabove, the operator pulls the ring 226 upwardly away from the top wall 34 of the camera thereby driving the roller 176, the film advancing apparatus 132 and the film cassette position apparatus so as to simultaneously move the film cassette 74 back to its first location within the film chamber 72 so as to locate a first predetermined area of a second film unit in position for exposure while moving the fully exposed film unit 78 out of the film cassette 74 via the exit slot 81 and into the bite of the rollers 176 and 178. The rollers 176 and 178 rupture a pod 386 located adjacent the leading end of the film unit and spread its contents across the film unit to initiate the formation of a visible image within the film unit while simultaneously advancing the film unit to the exterior of the camera via the exit 360 in the film door 22.

After all of the film units 78 (preferably four) in the film cassette 74 have been fully exposed and processed by passing them between the rollers 176 and 178 the empty film cassette may be removed from the camera by moving the flange 266, see FIGS. 2 and 3, forwardly. This action results in the pin 270 on the elongate member 232 being moved out of the slot 280 in the timing cam 120 so as to be out of interference with any of the projections therein. The timing cam 120, now being free of the pin 270, moves rapidly toward the rollers 176 and 178 under the biasing force of the spring 278. In its travel, it sequentially engages the cams 304 and 306 thereby maintaining the latch 298 in a position which enables the film cassette positioning structure to move from the position shown in FIG. 4 to that shown in FIG. 10 wherein access to the leading end of the film cassette is readily available since it is no longer underneath the forward wall 70 of the film chamber.

Since certain changes may be made in the above camera without departing from the scope of the invention herein involved, it is intended that all matter contained in the above description or shown in the accompanying drawings shall be interpreted as illustrative and not in a limiting sense. For example, although the invention has been described with reference to a folding type camera it is not meant to be so limited. Also, the power supply for the camera's shutter and/or exposure control circuit may take the form of a flat battery located in the film cassette, in which case the cassette would be provided with at least one elongate opening in its rear wall so as to enable a pair of battery contacts located within the film chamber to engage the terminals of the battery. Further, should the exposed film unit need to be further protected from the ambient light as it exits from the camera, the camera may be provided with an opaque shade of the type described in U.S. Pat. Nos. 3,940,774 and 3,996,595.

What is claimed is:

1. A hand-held camera for exposing a film unit comprising:
   means for defining a film chamber for receiving a film cassette containing at least one film unit and an opaque cover sheet for preventing premature exposure of the film unit;
   a housing mounted adjacent said film chamber for movement between a first position wherein it prevents loading of the film cassette into said film chamber and a second position wherein the film cassette may be inserted into said film chamber;
   means operatively disposed within said film chamber for initially engaging and limiting the degree of insertion of the film cassette into said film chamber to a first location, said operatively disposed means being movable out of limiting engagement with the film cassette in response to movement of said housing toward said first position;
   film cassette positioning means engageable with the film cassette within said film chamber after said housing has been moved into said first position;
   manually operable means drivably connected to said film cassette positioning means for moving the film cassette from said first location to a second location within said film chamber; and
   film advancing means operable during movement of the film cassette toward said second location for engaging and moving the opaque cover sheet away from covering relationship with the film unit in preparation for the exposure of the film unit.

2. A hand-held camera as defined in claim 1 wherein said film cassette positioning means includes means engageable with said film advancing means during actuation of said manually operable means for driving said film advancing means in a manner so as to move the opaque cover sheet out of the film cassette.

3. A hand-held camera as defined in claim 1 wherein said operatively disposed means includes a link pivotally connected intermediate its opposite first and second ends to a wall of said film chamber and means for biasing said second end into the path of travel of the film cassette as it is being inserted into said film chamber.

4. A hand-held camera as defined in claim 3 wherein said first end of said link is engageable and movable by said housing during movement of the latter from said second position to said first position for moving said second end of said link out of said path of travel.

5. A hand-held camera as defined in claim 1 further including a pair of juxtaposed rollers adapted to be drivably connected to said manually operable means, said rollers being positioned so as to receive the opaque cover sheet therebetween as it is being advanced by said film advancing means and continue its advancement away from the film cassette.

6. A hand-held camera as defined in claim 5 wherein said rollers are constructed to rupture a container of processing liquid and spread its contents across an exposed area of the film unit while simultaneously advancing it toward the exterior of said camera.

7. A hand-held camera as defined in claim 1 wherein said film advancing means is located closely adjacent a trailing edge of the opaque cover sheet when the cassette is located in the first location and is adapted to be driven in a direction opposite to that taken by the film cassette in moving from said first location to said second location.

* * * * *